United States Patent
Gimeno Grané et al.

(10) Patent No.: US 8,997,604 B2
(45) Date of Patent: Apr. 7, 2015

(54) ANCHORING DEVICE FOR A SHEATH TERMINAL

(75) Inventors: Santiago Gimeno Grané, Terrassa (ES); Juan Manuel Doña Contero, Rubi (ES); Jaume Prat Terradas, Barcelona (ES)

(73) Assignee: Fico Triad, S.A., Viladecavalls (ES)

( * ) Notice: Subject to any disclaimer, the term of this patent is extended or adjusted under 35 U.S.C. 154(b) by 59 days.

(21) Appl. No.: 13/604,622

(22) Filed: Sep. 5, 2012

(65) Prior Publication Data

US 2013/0061711 A1 Mar. 14, 2013

(30) Foreign Application Priority Data

Sep. 8, 2011 (EP) .................................. 11180572

(51) Int. Cl.
*F16C 1/10* (2006.01)
*F16C 1/26* (2006.01)

(52) U.S. Cl.
CPC ................. *F16C 1/262* (2013.01); *F16C 1/105* (2013.01); *F16C 2226/74* (2013.01)

(58) Field of Classification Search
CPC ....................................................... F16C 1/262
USPC ................. 74/473.15, 502.4, 502.6; 138/106; 403/397; 24/457–460, 669; 248/68.1, 248/73, 74.2, 220.22, 222.12, 669
IPC ........................................................ F16C 1/26
See application file for complete search history.

(56) References Cited

U.S. PATENT DOCUMENTS

| 2,166,916 | A | * | 7/1939 | Lombard | 248/73 |
|---|---|---|---|---|---|
| 2,954,248 | A | | 9/1960 | Brickman | |
| 4,614,321 | A | * | 9/1986 | Andre | 248/74.2 |
| 4,917,340 | A | * | 4/1990 | Juemann et al. | 248/74.2 |
| 5,590,567 | A | | 1/1997 | Marrs et al. | |
| 6,178,844 | B1 | * | 1/2001 | Burger | 74/502.4 |
| 6,634,252 | B2 | * | 10/2003 | Mayville et al. | 74/502.6 |
| 6,889,574 | B2 | | 5/2005 | Meyer | |
| 2003/0051570 | A1 | | 3/2003 | Meyer | |
| 2006/0110217 | A1 | | 5/2006 | Foster et al. | |

(Continued)

FOREIGN PATENT DOCUMENTS

| DE | 102005059833 A1 | 8/2006 | |
|---|---|---|---|
| EP | 239984 A2 | * 10/1987 | F16C 1/26 |

(Continued)

OTHER PUBLICATIONS

Machine translation of JP 2003336619 A obtained on Apr. 11, 2014.*

(Continued)

*Primary Examiner* — Thomas R. Hannon
*Assistant Examiner* — Adam D Rogers
(74) *Attorney, Agent, or Firm* — Peter B. Scull; Hamilton, DeSanctis & Cha LLP

(57) ABSTRACT

An anchoring device including a support member having a slot open out at one edge thereof for receiving a first cylindrical portion of the sheath terminal, a retainer for receiving and retaining a second cylindrical portion of the sheath terminal, and a guide for guiding the retainer as the second cylindrical portion of the sheath terminal is received therein, the guide including guide members that are formed integrally with the support member.

5 Claims, 4 Drawing Sheets

(56) References Cited

U.S. PATENT DOCUMENTS

| | | |
|---|---|---|
| 2009/0120231 A1 | 5/2009 | Ruhlander et al. |
| 2011/0252917 A1* | 10/2011 | Do?a Contero et al. ..... 74/502.4 |

FOREIGN PATENT DOCUMENTS

| | | |
|---|---|---|
| EP | 1041296 A1 | 10/2000 |
| EP | 2042752 A1 | 4/2009 |
| FR | 2634839 A1 | 2/1990 |
| FR | 2756879 A1 | 6/1998 |
| GB | 1161292 A | 8/1969 |
| GB | 2346186 A | 8/2000 |
| GB | 2417756 A | 3/2006 |
| JP | 2003336619 A | 11/2003 |
| WO | WO02064985 A1 | 8/2002 |
| WO | WO2004036068 A1 | 4/2004 |
| WO | WO2009064690 A1 | 5/2009 |

OTHER PUBLICATIONS

European Patent Office Extended European Search Report (SR), EP Application No. 11180572.7, Completed Feb. 1, 2012, Hague NL, Mailed Feb. 17, 2012, 6 pages, EPO, Rijswijk Netherlands.

* cited by examiner

ANCHORING DEVICE FOR A SHEATH TERMINAL

CROSS REFERENCE TO RELATED APPLICATIONS

This application is a United States Application claiming the benefit of priority to and from European Application No.: 11180572.7, filed on Sep. 8, 2011, the disclosure of which incorporated herein by this reference for all that it teaches and suggests.

TECHNICAL FIELD

The present disclosure relates to an anchoring device. More particularly, this disclosure relates to an anchoring device to be used for anchoring a sheath terminal in motor vehicle applications.

BACKGROUND

Anchoring devices are known for retaining cable sheaths in motor vehicle applications. A cable sheath surrounds a driving cable that is allowed to run therein. The driving cable is adapted to operate a brake, a throttle system, gear boxes, etc.

Known anchoring devices for cable sheaths include a sheath terminal and a support member. Such an anchoring device therefore serves the purpose of fixing the cable sheath to the support member. The support member can be integral with or attached to a suitable part of the motor vehicle, such as a fixed part, for example in the vehicle frame. The sheath terminal is arranged fixed to a length of the driving cable, usually to a portion in the vicinity of one end of the driving cable. The support member is adapted for receiving the sheath terminal. The support member in such anchoring devices usually includes a plate attached to said part of the motor vehicle, such as the vehicle frame. This plate is typically open at one edge thereof such that it is substantially U-shaped near said edge. The sheath terminal in turn includes a ringed groove for receiving the fixed support member, in the slot thereof.

Document WO2004036068, discloses an anchoring device for anchoring an elongate member to a support member. The support member has a slot leading to an edge thereof. The anchoring device includes a sleeve which can be fixed coaxially around the elongate member and which is provided with a circumferential groove having an axial length to accommodate the thickness of the fixed member at the slot. The outer diameter of the groove is smaller than the inner diameter of the slot. The anchoring device further includes a collar member which is carried by, and axially moveable along, said sleeve. The collar member has a leading edge extending into said groove when the anchoring device is located within said slot to increase the diameter of the groove and prevent the anchoring device from being withdrawn from the slot. The collar member is arranged such that the leading edge thereof can be withdrawn from the groove by moving the collar member along the sleeve in an axial direction away from the slot, so as to enable the anchoring device to be withdrawn from the slot.

GB2346186, discloses an anchoring device for anchoring an elongate member to a flat plate provided with a slot leading to one edge thereof. The device includes a sleeve for fitting over the member and having a groove slidable along the slot and a spring-loaded ring that is movable along said sleeve to allow accommodation of the slotted plate within the groove. The ring is biased to interlock with a projection on the plate.

A main disadvantage of such prior solutions is that as the sheath terminal is inserted by the operator into the support member, the terminal could be not completely fitted in the support member and therefore assembly may sometimes not be correctly performed.

Therefore there is the need for a device that provides for a quick and effective anchoring of a sheath terminal in a fixed support member. There is also a need for a device capable of providing a quick fixing of a cylindrical element such as a cable terminal while ensuring that said terminal can be only fitted in a full, right position into the fixed support.

One example of a device that has been proven to be efficient in overcoming said problems is the one disclosed in the European Patent application EP 2042752, A1, to the same applicant as that hereof. This document shows an anchoring device having a support member having a slot open out at one edge thereof adapted for receiving a first cylindrical portion of a sheath terminal. The device further includes gripping means for receiving and retaining a second cylindrical portion of the sheath terminal and biasing means for urging the gripping means in a radial direction that is substantially opposite the direction of insertion of the terminal. Guiding means are also provided serving the purpose of guiding the gripping means as they are displaced by the biasing means.

Although such device has been shown as effective to retain the sheath of a driving cable in position when it is operated and to ensure that the terminal is correctly inserted into the fixed support member, it is made of a large number of parts resulting in a complex structure.

SUMMARY

In order to keep the efficiency of the anchoring device disclosed in EP 2042752, A1, with a very simple and robust construction, the present developments provide improved anchoring devices for a sheath terminal that is advantageously made of fewer parts as compared with prior anchoring devices. More particularly, an anchoring device is provided having a support member having a slot open out at one edge thereof for receiving a first cylindrical portion of the sheath terminal and a retainer for receiving and retaining a second cylindrical portion of the sheath terminal.

According hereto, there is also provided a guide for guiding the retainer as the second cylindrical portion of the sheath terminal is received therein. Such a guide includes guide members that can be formed integrally with the support member.

The integral construction of the guide renders the whole assembly more compact and simple which positively affects the overall cost. This advantage in conjunction with the efficiency of this anchoring device itself results in a very convenient solution for anchoring a sheath terminal in motor vehicle applications.

According to a preferred embodiment of this anchoring device, the guide members may include at least one inclined ramp. At least a corresponding end of the retainer is abutting on this inclined ramp.

In some embodiments of the anchoring device, the configuration of the ramps of the guide members may be such that at least a corresponding end of the retainer slides against the ramps during insertion of the sheath terminal into the support member.

Thanks to the particular configuration of the guide members in the form of ramps, the ends of the retainer are allowed to slide against such ramps during insertion of the sheath terminal until said ends overcome the second cylindrical portion of the sheath terminal when the sheath terminal reaches an irreversible, final position.

In a preferred implementation, the second cylindrical portion of the sheath terminal has a diameter substantially larger than the distance between the ends of the retainer when the terminal is not inserted into the retainer.

In some embodiments, the retainer may include a resilient member having two opposite arms adapted for receiving and retaining the second cylindrical portion of the sheath terminal therebetween. This resilient member could be snap-fitted into the support member.

It is also envisaged that the retainer may be provided with a release portion. This release portion serves the purpose of pushing the retainer down or pushing the arms of the retainer apart for releasing the second cylindrical portion. The release portion may include at least one releasing arm.

The present anchoring device may further include a securing and guiding device formed in the retainer. This securing and guiding device cooperates with a corresponding securing and guiding device formed in the support member. Both securing and guiding devices serve the purpose of securing the retainer in the support member while providing easy and quick assembling and disassembling operations.

The above and other objects, features and advantages of the present anchoring device will become apparent from the following description when read in conjunction with the accompanying drawings. In these drawings, like reference numerals designate the same elements.

The drawings enclosed herein are for the sole purpose of illustration and description only. They are not intended as a definition of the limits of the invention.

BRIEF DESCRIPTION OF THE DRAWINGS

Particular embodiments of the present developments will be described in the following by way of non-limiting examples, with reference to the appended drawings, in which.

DETAILED DESCRIPTION

Figure 1:
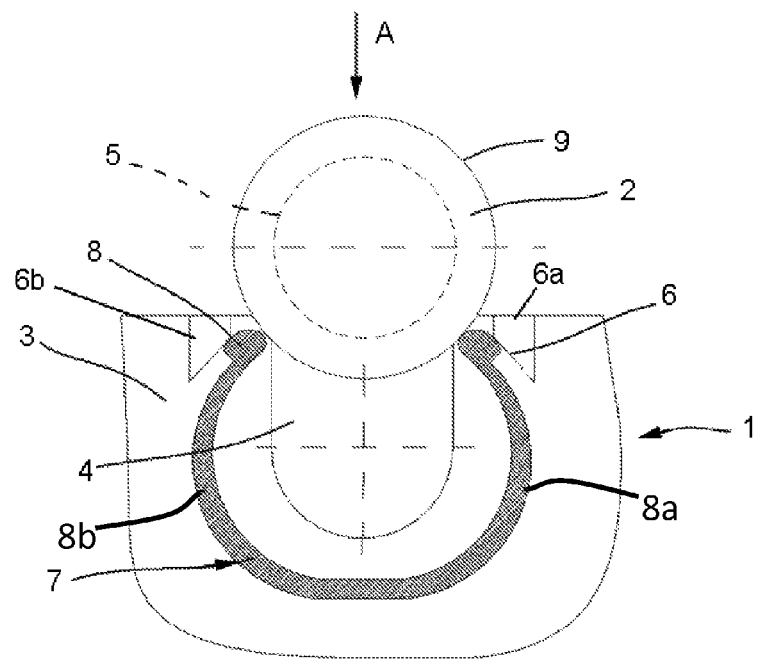
FIGS. 1-3 are front elevational, cross-sectional views of a first embodiment of the present anchoring device in which a sheath terminal is shown in a position out of the anchoring device, partially inserted into the anchoring device, and fully inserted into the anchoring device, respectively.

Preferred embodiments of the present anchoring device are now described in more detail referring to the accompanying drawings.

In the drawings, reference numeral 1 designates as a whole two possible embodiments of an anchoring device according hereto as shown in the figures and described fully below.

The anchoring device 1 in the drawings is intended for retaining a sheath terminal 2 in position against axial and/or radial forces that may be generated, for example, during normal use of a driving cable (not shown in the drawings), for example when driving a brake, a throttle system, or the like.

A shown in the figures of the drawings, the sheath terminal 2 of the exemplary embodiments in FIGS. 1-3 and 6 is a cylindrical piece having first and second cylindrical portions 5, 9. The diameters of the first and second cylindrical portions 5, 9 are different from each other, with the first cylindrical portion 5 being smaller in diameter than the second cylindrical portion 9. The sheath terminal 2 is arranged fixed to a length of the driving cable. The driving cable is usually arranged within the sheath terminal 2 running substantially coaxial thereto.

The anchoring device 1 shown in the drawings further includes a support member 3. The support member 3 is a mounting bracket. In the particular embodiments shown in the FIGS. 1-3 and 5 the support member 3 includes a metal plate having a slot 4 open out at its upper edge. Of course other suitable materials and/or alloys could be used for the support member 3. The slot 4 is suitably sized and shaped for receiving the first cylindrical portion 5 of the sheath terminal 2 as shown in the figures.

The anchoring device 1 further includes a retainer 7. The retainer 7 is in the form of a substantially U-shaped resilient member 7 that is adapted for being snap-fitted into the support member 3 as it will be described in greater detail below referring to FIGS. 4 and 5 of the drawings. The U-shaped resilient member 7 has two opposite arms 8a, and 8b (see FIG. 1), the ends 8 of which are rounded and larger than the general cross-section of the rest of the U-shaped member 7. This substantially U-shaped member 7 is suitably configured for receiving and retaining the second cylindrical portion 9 of the sheath terminal 2 between the arms of the resilient member 7.

The slot 4 of the support member 3 and the U-shaped member 7 are therefore adapted for receiving the first cylindrical portion 5 and the second cylindrical portion 9 of the sheath terminal 2, respectively. This is carried out in two different, substantially parallel planes. This can be clearly seen in FIG. 4 of the drawings.

Figure 2:
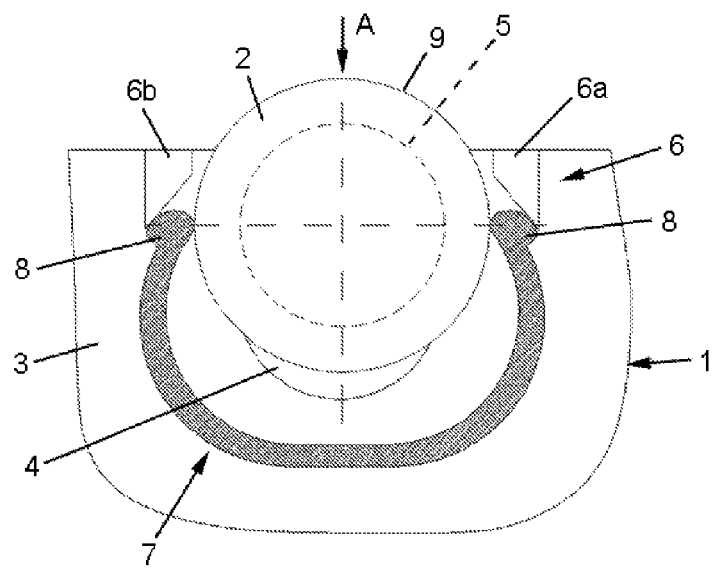

As stated above and shown in the FIGS. 1-3 and 5, the diameter of the second cylindrical portion 9 of the sheath terminal 2 is larger than the diameter of the first cylindrical portion 5 of the sheath terminal 2. As shown in FIGS. 1-3 and 5 of the drawings, the diameter of the second cylindrical portion 9 of the sheath terminal 2 is also substantially larger than the distance between the ends 8 of the U-shaped member 7 in a condition in which the sheath terminal 2 is not fully inserted into the U-shaped member of the retainer 7. This condition is shown in FIGS. 1 and 2.

Figure 3:
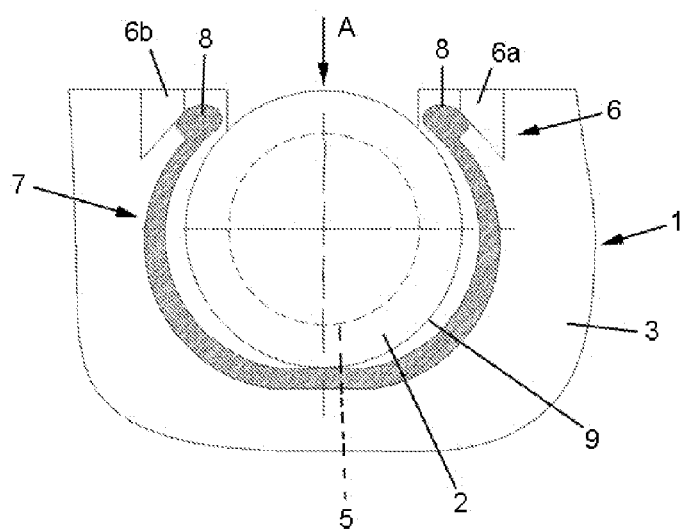

According to the above configuration and as shown in FIGS. 1-3, as the sheath terminal 2 is mounted on, i.e. inserted into, the support member 3 in the direction of insertion shown by arrow A, the arms of the U-shaped member 7 presses against the surface of the second cylindrical portion 9 of the sheath terminal 2 resulting in a first counter force applied in a reverse direction to the direction of insertion A of the sheath terminal 2. This occurs during insertion of the sheath terminal 2, that is, during the simultaneous insertion of the first cylindrical portion 5 of the sheath terminal 2 into the slot 4 of the support member 3 and the second cylindrical portion 9 of the sheath terminal 2 into the U-shaped member 7, i.e. between its opposite arms. During this action of insertion, the ends 8 of the U-shaped member 7 slide on the outer cylindrical surface of the second cylindrical portion 9 of the sheath terminal 2 while the sheath terminal 2 is moved relative to the U-shaped member 7.

The first force opposite to the direction of insertion A acts until the ends 8 of the U-shaped member 7 go beyond the second cylindrical portion 9 of the sheath terminal 2, that is, when the ends 8 of the U-shaped member 7 are in a position past the diameter of the second cylindrical portion 9, such as the position shown in FIG. 2 of the drawings. At this time, said first force opposite to the direction of insertion A of the sheath terminal 2 is reduced to disappear such that a second force is generated pushing the terminal sheath 2 into a final, irreversible position, as shown in FIG. 3.

The anchoring device 1 further includes a guide 6. The guide 6 serves the purpose of properly guiding the above mentioned U-shaped member of the retainer 7 as the second cylindrical portion 9 of the sheath terminal 2 is received inside the U-shaped member 7. In the embodiment shown in the figures, the guide 6 of the anchoring device 1 includes two spaced apart guide members 6a, 6b. The guide members 6a, 6b, are conveniently shaped for a proper operation of the U-shaped member 7.

According to an important feature of the present anchoring device 1, the guide members 6a, 6b, of the guide 6 are formed integrally with the support member 3. Said parts can be obtained in the same moulding process such that the resulting device 1 is advantageously more compact, durable, efficient and cost effective.

As shown in the figures, the guide members in the embodiment shown include opposite inclined ramps 6a, 6b. According to the above, the ramps 6a, 6b, are formed integrally with the support member 3, that is, formed as protruding portions of the support member 3. Ramps 6a, 6b, are arranged such that the corresponding ends 8 of the U-shaped member 7 abut thereon. Ramps 6a, 6b, are suitable for the sliding of the ends 8 of the U-shaped member 7 thereon during insertion of the sheath terminal 2 into the support member 3. Insertion of the sheath terminal 2 into the support member 3 causes the U-shaped member 7 to open outwards such that its respective arms are moved away to each other and against the ramps 6a, 6b. The features of the inclined ramps 6a, 6b, such that length, slope, etc. are suitable for proper sliding of the ends 8 of the U-shaped member 7 thereon during insertion of the sheath terminal 2 into the support member 3. Sliding of said ends 8 occurs until they overcome the second cylindrical portion 9 of the sheath terminal 2 (position shown in FIG. 3). At this time, the sheath terminal 2 has reached an irreversible, final position, as explained above.

Figure 6:
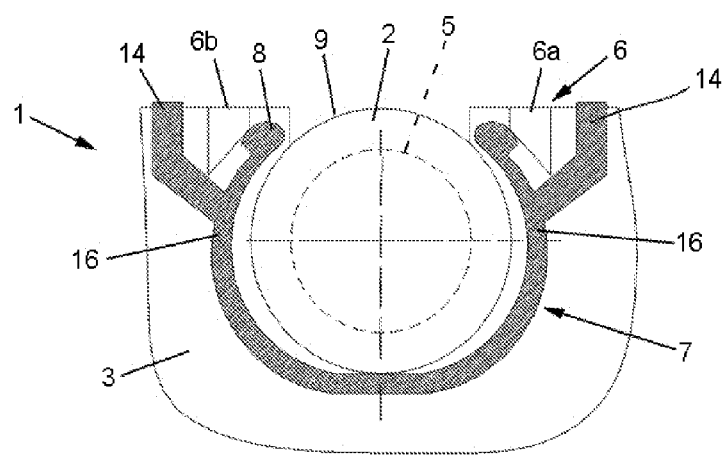
FIG. 6 is a front elevational, cross-sectional view of a second embodiment of an anchoring device hereof.

In the embodiment shown in FIG. 6 of the drawings, the U-shaped member of the retainer 7 is provided with a release portion 14. The release portion 14 includes a releasing arm extending substantially upwards and protruding from the support member 3. The releasing arm 14 allows an operator to easily act on the U-shaped member 7 for pushing it down or pushing its opposite arms apart for release of the second cylindrical portion 9 and therefore the sheath terminal 2. The releasing arm 14 in the embodiment shown in FIG. 6 is formed integrally in respective end portions 16 of the U-shaped member 7, near the opposite ends 8.

Figure 4:
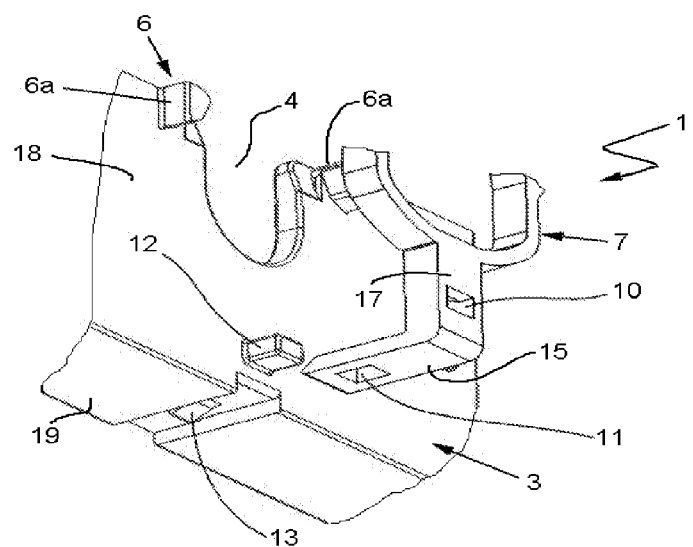
FIG. 4 is a fragmentary perspective view of one embodiment of an anchoring device according hereto in which the retainer is shown separated from the support member.
Figure 5:
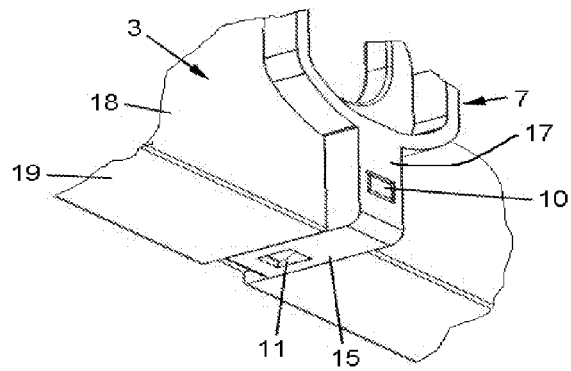
FIG. 5 is a fragmentary perspective view of the embodiment of the anchoring device in FIG. 4 in which the retainer is shown fitted on the support member.

Turning to FIGS. 4 and 5 of the drawings, the anchoring device 1 may further include first securing and guiding elements 10, 11 formed integrally in the U-shaped member 7. More specifically, the first securing and guiding elements include a first recess 10 that is formed in a substantially upright support portion 17 of the U-shaped member 7 as shown in the FIGS. 4 and 5. The first securing and guiding elements further include a second recess 11 formed in a substantially horizontal support portion 15 of the U-shaped member 7 as shown in said FIGS. 4 and 5.

The first securing and guiding elements 10, 11 are adapted to cooperate with corresponding second securing and guiding elements 12, 13 formed in the support member 3. More specifically, the second securing and guiding elements includes a first protrusion 12 formed in a substantially vertical wall 18 of the support member 3 as shown in the FIGS. 4 and 5. The second securing and guiding elements further include a second protrusion 13 formed in a substantially horizontal wall 19 of the support member 3 as shown in said FIGS. 4 and 5.

The protrusions 12,13 in the support member 3 are adapted to snap fit into the corresponding recesses 10, 11 in the U-shaped member 7. Parts 10, 11, 12, 13 are thus complementarily shaped and sized to this effect. Embodiments are of course envisaged in which recesses 10, 11 and protrusions 12,13 are interchangeably used in both the U-shaped member 7 and the support member 3.

An anchoring device 1 as in the examples disclosed herein does not make use of springs or any other complex part so a simple device is obtained, In this respect, the present anchoring device 1 is made of three main parts (sheath terminal, 2, support member 3, retaining member 7), fewer than in the prior anchoring devices used for this purpose.

Although only a number of particular embodiments and examples of the anchoring device hereof have been disclosed herein, it will be understood by those skilled in the art that other alternative embodiments and/or uses hereof and obvious modifications and equivalents thereof are possible.

The present developments cover all possible combinations of the particular embodiments described. Reference signs related to drawings and placed in parentheses in a claim, are solely for attempting to increase the intelligibility of the claim, and shall not be construed as limiting the scope of the claim. Thus, the scope of the present claims should not be limited by particular embodiments, but should be determined only by a fair reading of the claims that follow.

The invention claimed is:

1. An anchoring device comprising:
   a sheath terminal having a first cylindrical portion and a second cylindrical portion;
   a support member having a slot open at one edge thereof configured for receiving the first cylindrical portion of the sheath terminal; and
   a retainer having a substantially U-shaped portion forming a resilient member extending into two opposite arms provided with ends, the retainer being configured for being snap-fit into the support member and configured for receiving and retaining the second cylindrical portion of the sheath terminal therebetween;
   wherein the second cylindrical portion of the sheath terminal has a diameter larger than a distance between the ends of the retainer when the sheath terminal is not inserted into the retainer,
   wherein the support member has a guide element comprising guide members that are formed integrally therewith for guiding the retainer as the second cylindrical portion of a sheath terminal is received into the support member,
   wherein each guide member comprises at least one inclined ramp on which at least a corresponding end of the retainer is abutting;
   wherein the configuration of the at least one inclined ramp of each of the guide members is such that the ends of the retainer slide on the guide members until said ends overcome the second cylindrical portion of the sheath terminal when the sheath terminal has reached an irreversible, final position, and
   a securing and guiding device formed in the retainer that cooperates with a corresponding securing and guiding device formed in the support member configured for securing and guiding the retainer with the support member protruding respectively from a substantially vertical wall of the support member and a substantially horizontal wall of the support member.

2. An anchoring device as in claim 1, wherein each of the at least one inclined ramp of the guide members has a configuration such that at least the corresponding end of the retainer slides against said ramps during insertion of the sheath terminal into the support member.

3. An anchoring device as in claim 1, wherein the retainer is provided with a release portion configured for separating the retainer from the guide element for releasing the second cylindrical portion.

4. An anchoring device as in claim 3, wherein the release portion comprises at least one releasing arm configured for pushing the retainer down or pushing the arms of the retainer apart for release.

5. An anchoring device comprising:
   a sheath terminal having a first cylindrical portion and a second cylindrical portion;
   a support member having a slot open at one edge thereof configured for receiving the first cylindrical portion of the sheath terminal; and
   a retainer having a substantially U-shaped portion forming a resilient member extending into two opposite arms provided with ends, the retainer being configured for being snap-fitted into the support member and configured for receiving and retaining the second cylindrical portion of the sheath terminal therebetween;
   wherein the second cylindrical portion of the sheath terminal has a diameter larger than a distance between the ends of the retainer when the sheath terminal is not inserted into the retainer, wherein the support member has a guide element comprising guide members that are formed integrally therewith for guiding the retainer as the second cylindrical portion of the sheath terminal is received into the support member,
   wherein the configuration of the guide members is such that the ends of the retainer slide on the guide members until said ends overcome the second cylindrical portion of the sheath terminal when the sheath terminal has reached an irreversible, final position, and
   a securing and guiding device formed in the retainer that cooperates with a corresponding securing and guiding device formed in the support member configured for securing and guiding the retainer with the support member protruding respectively from a substantially vertical wall of the support member and a substantially horizontal wall of the support member.

* * * * *